United States Patent [19]

Walenty et al.

[11] Patent Number: 5,646,848
[45] Date of Patent: Jul. 8, 1997

[54] METHOD FOR PROPORTIONALLY CONTROLLING THE BRAKES OF A VEHICLE BASED ON TIRE DEFORMATION

[75] Inventors: Allen John Walenty, Macomb; Kevin Gerard Leppek, Rochester Hills; David Alan Thatcher, Troy, all of Mich.

[73] Assignee: General Motors Corporation, Detroit, Mich.

[21] Appl. No.: 513,192

[22] Filed: Aug. 9, 1995

[51] Int. Cl.$^6$ .................................................... B60T 13/74
[52] U.S. Cl. ........................ 364/426.01; 303/9.62; 303/155; 303/186; 303/167
[58] Field of Search .............. 364/426.01; 303/9.62, 303/155, 167, 169, 186

[56] References Cited

U.S. PATENT DOCUMENTS

| | | | |
|---|---|---|---|
| 4,750,125 | 6/1988 | Leppek et al. | 364/426 |
| 4,835,695 | 5/1989 | Walenty et al. | 364/426.02 |
| 4,850,650 | 7/1989 | Eckert et al. | 303/9.62 |
| 4,916,619 | 4/1990 | Walenty et al. | 364/426.02 |
| 4,917,445 | 4/1990 | Leppek et al. | 303/100 |
| 4,969,756 | 11/1990 | Villec et al. | 388/815 |
| 5,163,743 | 11/1992 | Leppek et al. | 303/100 |
| 5,173,860 | 12/1992 | Walenty et al. | 364/426.03 |
| 5,234,262 | 8/1993 | Walenty | 303/111 |
| 5,320,421 | 6/1994 | Kade et al. | 303/110 |
| 5,390,992 | 2/1995 | Walenty et al. | 303/112 |
| 5,454,630 | 10/1995 | Zhang | 303/175 |
| 5,539,641 | 7/1996 | Littlejohn | 364/426.01 |
| 5,558,409 | 9/1996 | Walenty et al. | 303/10 |

FOREIGN PATENT DOCUMENTS 0170478  5/1986  European Pat. Off. .

OTHER PUBLICATIONS

Brake Adjuster Algorithm, Research Disclosure No. 32411, Published Apr. 1991.
Brake Fade Compensation Technique, Research Disclosure No. 31961, Published Nov. 1990.
Surface Adaptive Torque Release, Research Disclosure No. 30762, Published Nov. 1989.
Slip Command Brake Apply System, Research Disclosure No. 31955, Published Nov. 1990.
Vehicle Reference Over–Speed Normalization, Research Disclosure No. 31359, Published May 1990.
Method to Compensate for Velocity Dependent Compliance Variation in Drum Brakes, Research Disclosure No. 36801, Published Dec. 1994.
Adaptive Proportioning Fail–Safe, Research Disclosure No. 36621, Published Oct. 1994.
Adaptive Brake Proportioning, Research Disclosure No. 30755, Published Nov. 1989.

*Primary Examiner*—Michael Zanelli
*Attorney, Agent, or Firm*—Anthony Luke Simon

[57] ABSTRACT

A method of brake control, comprising the steps of: determining a deceleration of a vehicle; measuring a first wheel rotational velocity of a front wheel of the vehicle; measuring a second wheel rotational velocity of a rear wheel of the vehicle; determining a front wheel normalization value responsive to the deceleration and a front tire deformation constant; determining a rear wheel normalization value responsive to the deceleration and a rear tire deformation constant; determining a front normalized wheel rotational velocity responsive to the front wheel normalization value and the first wheel rotational velocity, wherein the front normalized wheel rotational velocity is responsive to a front tire deformation that occurs during a braking maneuver of the vehicle; determining a rear normalized wheel rotational velocity responsive to the rear wheel normalization value and the second wheel rotational velocity, wherein the rear normalized wheel rotational velocity is responsive to a rear tire deformation that occurs during a braking maneuver of the vehicle; subtracting the front normalized wheel rotational velocity from the rear normalized wheel rotational velocity to determine a difference; and adjusting front to rear brake proportioning responsive to the difference, wherein front to rear brake proportioning is responsive to tire deformation that occurs during a braking maneuver.

5 Claims, 3 Drawing Sheets

METHOD FOR PROPORTIONALLY CONTROLLING THE BRAKES OF A VEHICLE BASED ON TIRE DEFORMATION

This invention relates to a method of brake control.

BACKGROUND OF THE INVENTION

In conventional automotive brake systems, front to rear brake proportioning is typically designed into the system by specification of system hardware, such as proportioning valves, and, once designed, is fixed by the system hardware. In drive-by-wire brake systems, front to rear brake proportioning can be dynamically adjustable. In other words, the gain of the rear brake force or pressure as compared to the gain of the front brake force or pressure varies dynamically under electronic control. Such systems may be referred to as dynamic brake proportioning systems. In a dynamic brake proportioning system, a parameter input, such as vehicle deceleration, may be used to adjust proportioning of the front to rear brakes to meet a specific system design objective.

SUMMARY OF THE PRESENT INVENTION

A brake control method in accordance with the present invention is characterized by the features specified in claim 1.

Advantageously, this invention provides a brake control method that dynamically adjusts front to rear braking proportioning based on wheel speed information.

Advantageously, this invention provides a brake control method that dynamically adjusts front to rear brake proportioning by taking into account the fact that weight transference during vehicle braking affects measured wheel speed. During braking of the vehicle, as vehicle weight shifts, the front and rear tires deform from their typical rolling diameters. This invention compensates for the effect of tire deformation that occurs during deceleration weight transfer between front and rear wheels, thus allowing front to rear dynamic proportioning to be responsive to tire deformation.

Advantageously, in one example, this invention provides a brake control method according to the steps of: determining a deceleration of a vehicle; measuring a first wheel rotational velocity of a front wheel of the vehicle; measuring a second wheel rotational velocity of a rear wheel of the vehicle; determining a front wheel normalization value responsive to the deceleration and a front tire deformation constant; determining a rear wheel normalization value responsive to the deceleration and a rear tire deformation constant; determining a front normalized wheel rotational velocity responsive to the front wheel normalization value and the first wheel rotational velocity, wherein the front normalized wheel rotational velocity is responsive to a front tire deformation that occurs during a braking maneuver of the vehicle; determining a rear normalized wheel rotational velocity responsive to the rear wheel normalization value and the second wheel rotational velocity, wherein the rear normalized wheel rotational velocity is responsive to a rear tire deformation that occurs during a braking maneuver of the vehicle; subtracting the front normalized wheel rotational velocity from the rear normalized wheel rotational velocity to determine a difference; and adjusting front to rear brake proportioning responsive to the difference, wherein front to rear brake proportioning is responsive to tire deformation that occurs during a braking maneuver.

BRIEF DESCRIPTION OF THE DRAWINGS

The present invention will now be described, by way of example, with reference to the accompanying drawings, in which.

DETAILED DESCRIPTION OF THE INVENTION

Figure 1:
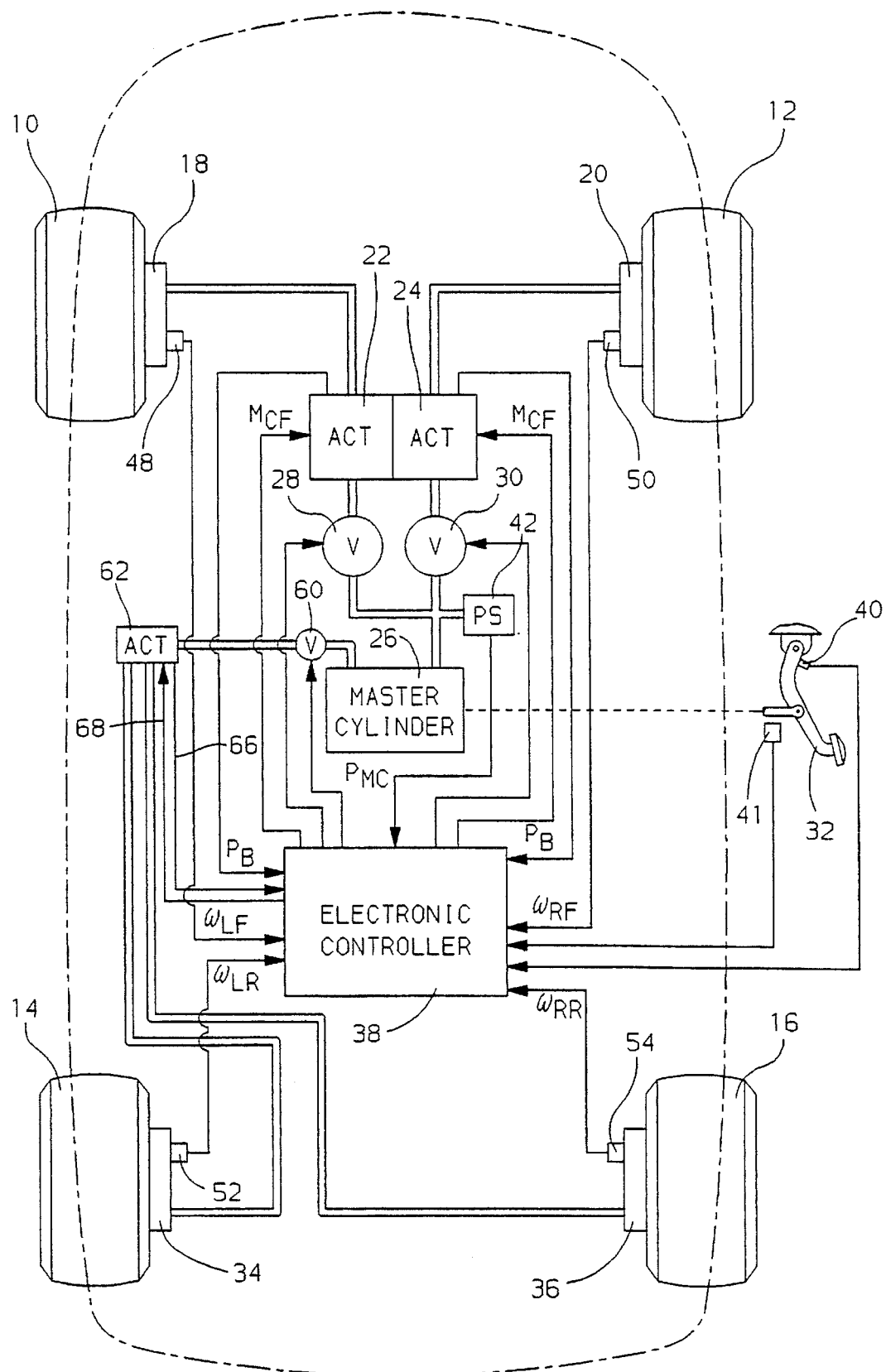
FIG. 1 is a schematic of a brake system according to this invention.

In antilock and/or traction control brake systems, it is known to, during constant velocity conditions of vehicle travel, measure wheel speeds and use the measured wheel speeds to determine normalization factors for each wheel. The normalization factors take into account tire pressure, tire wear, tire size/style, the existence of a spare tire, etc., when calculating vehicle speed based on the wheel speeds.

According to this invention, it is recognized that as the vehicle decelerates, such as during a braking maneuver, the tires becomes deformed responsive to the amount of brake torque on each wheel, the weight on each wheel, and the coefficient of friction between the tire and the road surface. Weight transference during deceleration and steering maneuvers can dramatically change the weight on each wheel. The vehicle weight supported on the front wheels of a typical front wheel drive vehicle, with no steering input, is generally 60–70% of the gross vehicle weight at zero G braking deceleration and 80–90% gross vehicle weight at one G braking. The rear wheels typically support 30–40 percent of the gross vehicle weight at zero G and 10–20% of the gross vehicle weight at one G braking.

For example, assume a vehicle with a gross vehicle weight of 3500 lb. With a 60-40% weight distribution under zero G acceleration, each front wheel supports 1050 lb. and each rear wheel supports 700 lb.. With a 90-10% weight distribution under a one G deceleration, each front wheel supports 1575 lb. and each rear wheel supports 175 lb.. The change in weight from zero to one G on the from wheels is an increase by a factor of 1.5. The change in weight from zero to one G on the rear wheels is a decrease by a factor of 0.25.

The vehicle tires deform relative to the weight that they are supporting. For a vehicle traveling at a constant velocity, as more weight is supported by a tire, the tire rolling radius decreases, increasing the measured wheel speed, even though the vehicle speed has remained constant. Conversely, as weight is removed from a tire, the tire rolling radius increases, decreasing the measured wheel speed even though the vehicle speed has remained constant. Thus for a dynamic proportioning brake control based on wheel speeds measured during braking maneuvers, unless accounted for according to this invention, the change in rolling radii effect the wheel speed measurements that are inputs to the control algorithm and thus effect the control algorithm.

According to this invention, it has been found that a linear relationship exists between the weight distribution and rolling radius for the ranges of vehicle decelerations that occur under normal operating conditions. Thus according to this invention, front to rear brake proportioning can account for rolling radius change with a single calibratable function to adjust front or rear braking commands. This will be described in more detail with reference to the example implementation of this invention illustrated in FIGS. 1–3.

Referring to FIG. 1, the example vehicle braking system illustrated includes left and right from driven wheels 10 and 12 and left and right rear non-driven wheels 14 and 16. The front and rear wheels 10, 12, 14 and 16 have respective hydraulic actuated brakes 18, 20, 34 and 36 actuated by hydraulic pressure generated via respective electrohydraulic actuators 22, 24 and 62 (for both rear brakes 34 and 36). Each of the hydraulic brakes 18, 20, 34 and 36 are further hydraulically coupled to a conventional master cylinder 26 through respective normally opened electromagnetic valves 28, 30 and 60. Actuators 22, 24, 62 include a working chamber hydraulically coupled to the wheel brakes 18, 20, 34 and 36 and the valves 28, 30 and 60. In the preferred form of the invention, the electrohydraulic actuators 22, 24 and 62 each take the form of a brushless dc motor driven actuator wherein a motor is operated to control a piston for regulating the braking pressure (the motor for actuator 62 drives two pistons in parallel, one for each rear brake 34, 36). The brake torque is established at each brake 18, 20, 34, 36 at a value proportional to the position of each actuator piston and is reflected through the torque output of the respective motor. For example, the electrohydraulic brake actuators 22, 24, 62 may each take the general form of the electrohydraulic actuator as described in the U.S. Pat. No. RE 33,557, which issued Mar. 19, 1991, assigned to the assignee of this invention. As discussed below, the actuators 22, 24 and 62 may be operated generally as described in U.S. patent application, Ser. No. 08/355,468, filed Dec. 14, 1994, now U.S. Pat. No. 5,558,409, assigned to the assignee of this invention, the disclosure of which is incorporated herein by reference.

The master cylinder 26 is operated by a conventional vehicle brake pedal 32 in response to the foot pressure applied by the vehicle operator.

While as illustrated in FIG. 1 the rear wheels are braked by electrohydraulic actuator 62, the rear wheels may alternatively be braked means of a pair of electrically operated brakes 34 and 36. Such brakes 34 and 36 may each take the form of an electronically operated drum brake in which the braking torque is established by operation of a dc torque motor and at a value proportional to the torque output of the dc torque motor. One example of such a brake is illustrated in the U.S. Pat. No. 5,000,291, issued Mar. 19, 1991, assigned to the assignee of this invention.

The front and rear brakes 18, 20, 34 and 36 are operated to establish a desired braking condition by means of an electronic controller 38. In general, the electronic controller 38 senses a braking command input by the vehicle operator by sensing the state of a conventional brake switch 40 which provides a signal when the vehicle operator applies pressure to the brake pedal 32. When the brake switch input is sensed, the electronic controller 38 operates the electromagnetic valves 28, 30 and 60 to close off the hydraulic communication between the master cylinder and the electrohydraulic actuators 22 and 24. This effectively isolates the wheel brakes 18, 20, 34 and 36 from the master cylinder 26 such that the hydraulic pressures at the wheel brakes are controlled solely by means of the electrohydraulic actuators 22, 24 and 62. The degree of braking effort commanded by the vehicle operator is sensed by means of a pedal position sensor 41 and a pressure sensor 42 monitoring operator depression of pedal 32 and the hydraulic pressure output of master cylinder 26, respectively. As is well known, the hydraulic pressure output of the master cylinder 26 is directly proportional to the applied pressure to the brake pedal 32 controlling the position of the master cylinder 26 and the position output of sensor 41.

Both the pedal position and the pedal pressure may be used to determine the operator requested brake effort command. In response to the brake effort command, the electronic controller 38 provides for establishing a desired brake torque at each of the wheels 10, 12, 14 and 16 via the respective brakes 18, 20, 34 and 36 by commanding motor current to each actuator 22, 24 and 62 to establish the actuator position, and therefore the brake pressure, for each brake 18, 20, 34 and 36 at a desired level related to the brake effort command.

The actuator position feedback provided by the actuators 22, 24 and 68 used in a standard commutation control to control the switching of the dc brushless motors provide closed-loop brake actuator position control in accordance with the like control described in the pending U.S. patent application, Ser. No. 08/355,468.

Figure 2:
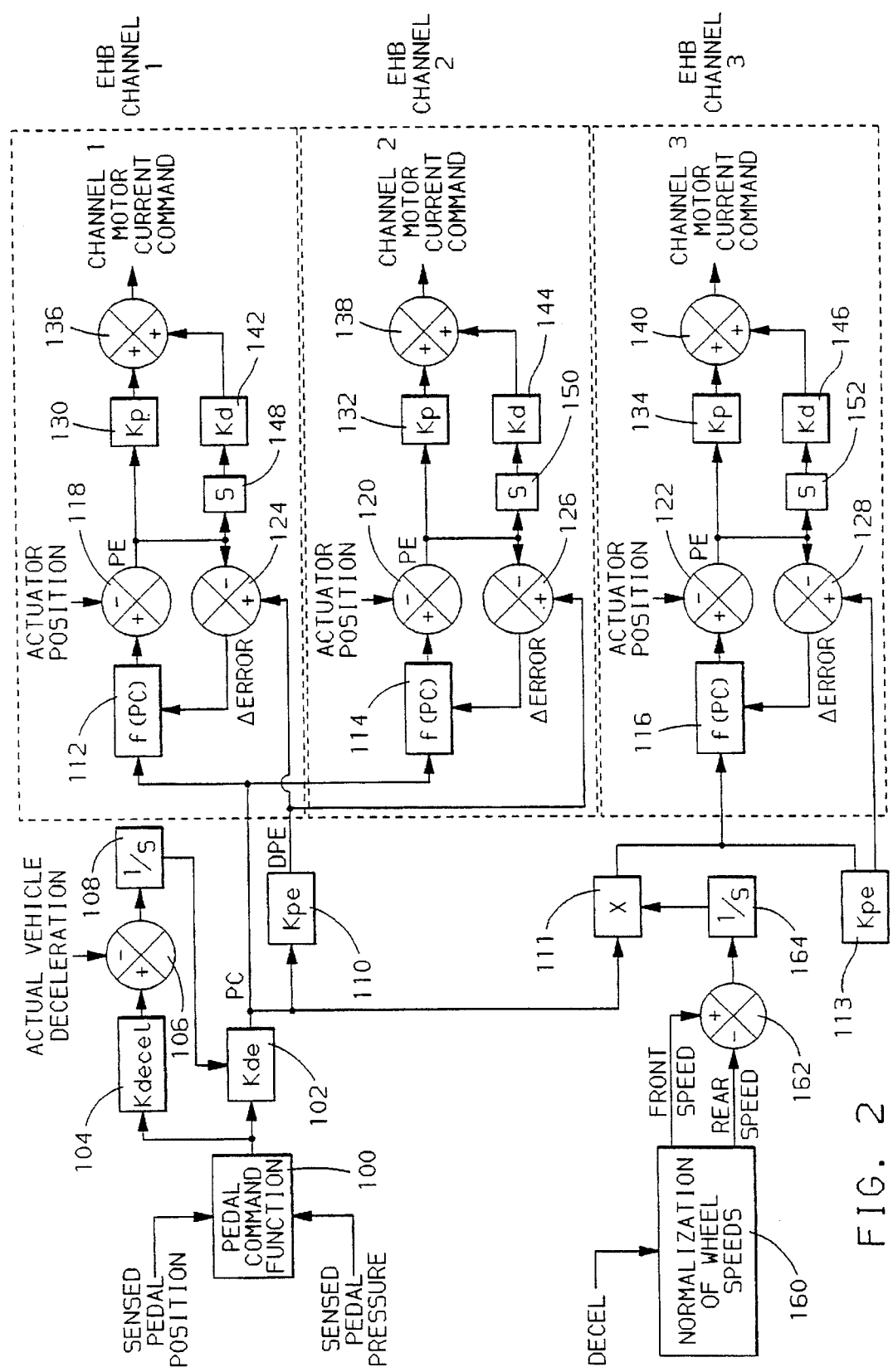
FIG. 2 is a control diagram illustrating an example brake control method according to this invention.

Referring to FIG. 2, much of the control structure shown is also shown and described in the above mentioned pending application, Ser. No. 08/355,468, portions of which are now repeated, with modifications according to this invention. In the present example, three braking channels are controlled. The first braking channel, EHB channel 1, is applied to a first front vehicle wheel, a second braking channel, EHB channel 2, is applied to a second front vehicle wheel laterally opposing the first front vehicle wheel, and a third braking channel, EHB channel 3, is applied to the rear vehicle wheels.

An operator braking command is transduced into a sensed pedal position by sensor 41 of FIG. 1 and a sensed pedal pressure by pressure transducer 42 of FIG. 1. Such inputs are provided to pedal command function block 100 of FIG. 2, which applies the two inputs through a predetermined function to resolve the degree of operator requested braking. For example, sensed pedal position may provide precise, responsive feedback on even minor depressions or releases of the brake pedal in accord with minor manual variations in commanded braking. The information provided by the position sensor 41 is supplemented in this embodiment by position transducer information from transducer 42 (FIG. 1) which senses changes in pressure relating to changes in commanded braking from a vehicle operator over a broader range of pedal depression than the position sensor 41. Accordingly, when the position sensor 41 runs out of authority, such as when the pedal 32 is depressed to a position exceeding the position sensing range of the sensor, commanded braking information may still be indicated as sensed change in the brake fluid pressure in master cylinder 26 (FIG. 1). Through such a hybrid sensing approach, rapid and high resolution brake pedal depression sensing is provided under relatively small brake pedal depressions through sensed changes in pedal position with sensor 41. The high resolution position sensing may not extend over the entire range of possible brake pedal inputs. However, the pressure transducer 42 is available to sense more severe pedal depressions and to indicate such depressions. As the more severe depressions typically need not be sensed and indicated with relatively high resolution, the pressure transducer 42 adequately indicates brake commands under such conditions.

The two signals indicating braking command are provided to the pedal command function block 100 where they are resolved into a single brake command to which the control of EHB in accord with this embodiment is responsive. Closed-loop vehicle deceleration control is provided for EHB control enhancement in accord with this embodiment. A desired vehicle deceleration value is determined as a predetermined function of the resolved pedal command by passing the command through a gain block 104 having predetermined gain Kdecel. The desired deceleration is applied to summing node 106 at which it is combined with a sensed or calculated actual vehicle deceleration value to form a deceleration error value. The actual deceleration value may be determined by calculating a change in vehicle speed over a predetermined time period. The deceleration error is next integrated via integrator 108 to form a pedal command gain Kde which is applied to the pedal command function output at block 102 to form pedal command PC which is applied to a closed-loop position control function for each EHB channel in accord with this embodiment.

Specifically, actuator position control for each of the three EHB channels of this embodiment is responsive to the single command PC, although the mount of actuator position needed by each channel to achieve the braking pressure corresponding to the command PC may vary from channel to channel. Actuator position is proportional to brake line pressure and therefore, by driving actuator position to a commanded actuator position, the desired brake pressure may be controllably driven to a preferred brake pressure and thus a desired degree of braking may be provided without use of motor current feedback information which tends to be noisy and difficult to process. The control function of FIG. 2 is thus a position-based control function for brake pressure control relying on the proportional relationship between piston position of a brake pressure modulator and brake pressure in the EHB system of the present embodiment.

To further enhance the position control, and especially the responsiveness of the control to a change in the pedal command PC, an additional control loop is provided for varying the commanded actuator position as a function of the pedal command PC in accord with a ΔERROR value generated as a difference between a desired position error DPE and an actual position error between commanded and actual actuator position. By adjusting the function for driving an actuator command from a pedal command in this manner, a more responsive actuator command to a change in pedal command may be provided for more rapid brake pressure control in response to a pedal command change. Specifically, the pedal command and a predetermined linear function of the pedal command DPE, which is a desired position determined by applying the pedal position command PC to a gain Kpe at a gain stage 110, 113, are applied to each of the EHB control functions of FIG. 2. Accordingly then, each EHB control function is responsive to a single pedal command PC and to a single desired position error DPE. However, due to variations in brake wear and to such factors as variations in brake line compliance, hydraulic compliance, mechanical compliance and to other variations from channel to channel within the EHB system of an automotive vehicle, the actuator position that is generated responsive to the values PC and DPE may vary between channels. Such variations are compensated by the individual EHB channels of this embodiment by varying the relationship between the pedal command PC and the individual EHB actuator commands in accord with a difference DPE and actual position error for the corresponding channel, as will be further detailed.

Returning to FIG. 2, the pedal command PC is applied to a function at blocks 112 and 114 for generating a commanded actuator position for the front brake channels. PC is modified according to this invention, as will be explained below, and then applied to function block 116 and gain stage 113 of the rear brake channel, channel 3, to generate commanded rear actuator position values. The functions applied at the blocks 112, 114, and 116 may vary from channel to channel of a vehicle and may be a nonlinear function calibrated to relate pedal command PC values to desired actuator positions to provide for vehicle braking performance consistent with conventionally understood control practices. The function block 116 differs from the function blocks 112 and 114 to implement desired front to rear brake torque proportioning, either statically or dynamically, according to control practices understood by those skilled in the art.

The commanded actuator position is next applied to summing node 118 for channel 1, 120 for channel 2 and 122 for channel 3 to which is also applied a measure of actuator position. The actuator position is provided through the counting of the state changes in the position sensors (not shown) of the DC brushless actuators of this embodiment as described in detail in U.S. Pat. No. 5,320,421, assigned to the assignee of this invention and having a disclosure incorporated herein by reference. The actual actuator positions are subtracted from the commanded positions at the summing nodes 118, 120 and 122 to form position error PE values. The PE values are applied to a proportional-derivative control function including proportional gain Kp, at blocks 130, 132 and 134 of the three EHB channels and including the derivative function process of blocks 148, 150 and 152 and derivative gain Kd of blocks 142, 144 and 146. The products of the proportional gain applied to PE and the derivative gain applied to the derivative of PE are then summed at each of summing nodes 136, 138 and 140 to realize the motor current commands for each of the EHB channels. The motor current commands are applied to the DC brushless motor control circuitry to provide for the actuator positioning so that the proper brake pressure is applied to each of the channels of this embodiment.

Returning to summing nodes 118, 120, and 122, the position errors PE determined at such nodes are fed back to respective summing nodes 124, 126 and 128 to be subtracted from the desired position error DPE to form ΔERROR values for the three channels. ΔERROR represents a difference between the desired position error DPE generated by applying PC to the gain block 110, 113 and an actual position error generated at the summing nodes 118, 120 and 122 for the three EHB channels. The ΔERROR values are applied as an adjustment for adapting the function of blocks 112, 114 and 116 of the 3 EHB channels to "learn in" the proper function value needed to provide an appropriate motor command to position the corresponding actuator rapidly to the position required to provide the proper braking in accord with the pedal command PC. This provides a more responsive brake pressure control and avoids a gradual adjustment of brake pressure in response to a change in PC. Further channel to channel differences may be accounted for by compensating the position command on a channel by channel basis as a function of corresponding actuator position.

When the functions of blocks 112, 114, 116 have been fully adjusted, wherein ΔERROR values have been applied repeatedly, if necessary, to the different function values corresponding to the range of PC values applied thereto, the commanded actuator positions yielded by the functions of blocks 112, 114 and 116 will provide for a position errors leading to motor current commands that provide highly responsive braking control in response to the PC.

Further detail of the basic channel controls for channels 1, 2 and 3 is fully set forth in the above mentioned pending application Ser. No. 08/355,468 and need not be repeated herein because it is not central to this invention.

Referring again to block 111, block 111 modifies the pedal command when the vehicle undergoes deceleration caused by braking. In steady state vehicle conditions, block 111 is passive.

Assume a non-steady state vehicle condition during which the vehicle operator is applying the brakes and the vehicle is decelerating. As explained above, the weight supported by the front wheels of the vehicle increases and the weight supported by the rear wheels of the vehicle decreases. The increase in the weight supported by the front wheels causes the rolling diameter of the front wheels to decrease and the decrease of weight supported by the rear wheels causes the rolling diameter of the rear wheels to increase. Thus, according to this invention, the measured wheel speeds are used to vary the front to rear brake proportioning to compensate for change in rolling radius on the desired brake proportioning function.

More particularly, block 160 determines adjusted front and rear wheel speeds responsive to actual wheel speeds measured by the wheel speed sensors and normalization values determined responsive to measured or calculated vehicle deceleration. Block 160 also determines a sum of the adjusted front wheel speeds and a sum of the adjusted rear wheel speeds and outputs the sums to block 162. Block 162 subtracts the sum of the rear wheel speeds from the sum of the front wheel speeds to determine a dynamic proportioning adjustment. Block 164 is an integrator that low pass filters the dynamic proportioning adjustment, and may, to achieve a desired system response, introduce a gain factor Kdp. Block 111 sums the output of block 164 with the pedal command PC and provides the result to blocks 116 and 113. As a result, blocks 116 and 113 operate responsive to the pedal command PC and to the effect of vehicle body weight shift on tire rolling radius, thereby compensating for the effect of vehicle body weight shift on rolling radius and measured wheel speeds.

Figure 3:
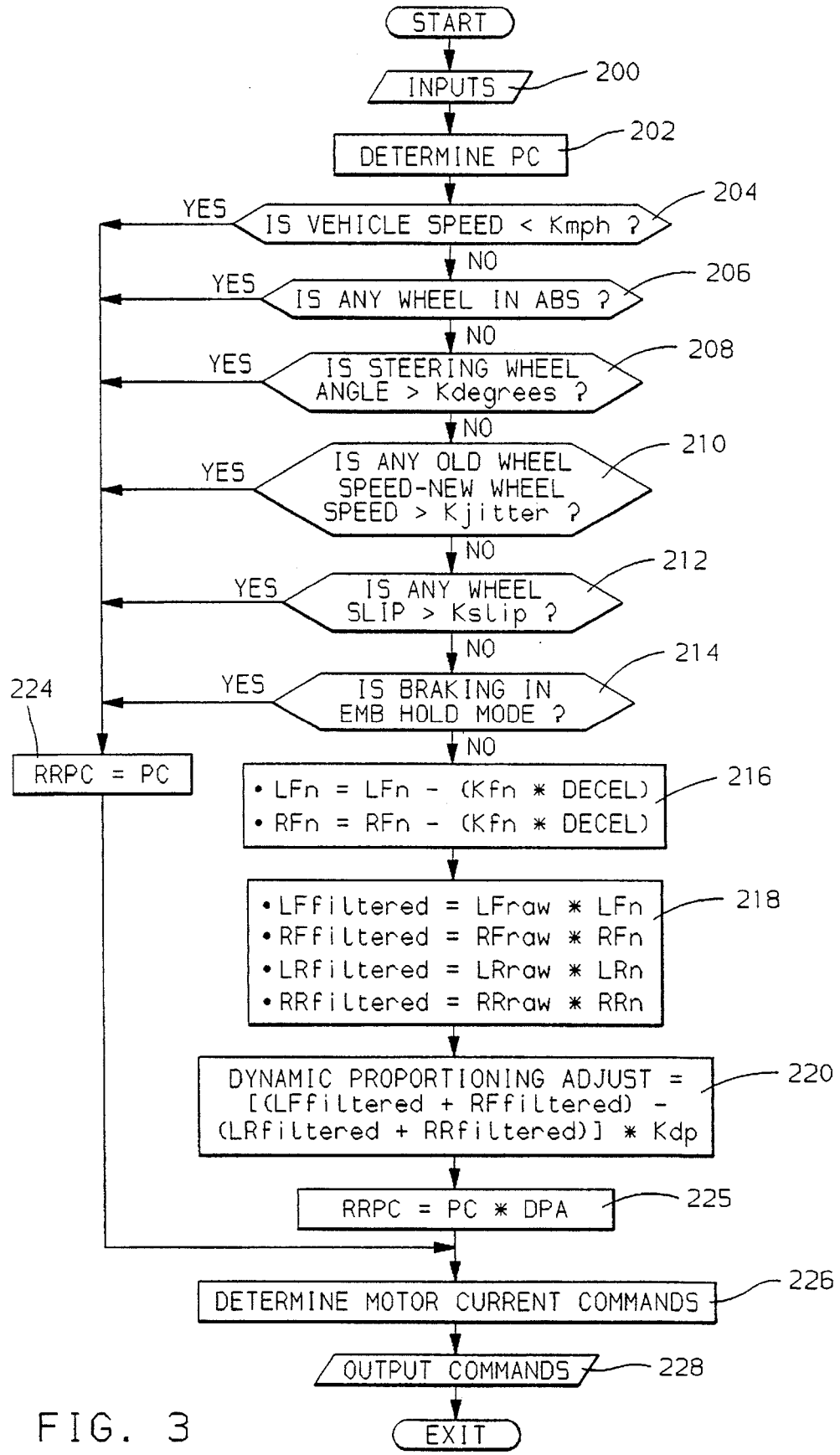
FIG. 3 is an example flow diagram for implementing the brake control method according to this invention.

Referring now to FIG. 3, a flow diagram indicating portions of a brake control routine for implementing the brake control method according to this invention is shown. At block 200, the input signals such as brake pedal pressure, brake pedal displacement, and vehicle wheel speeds are received by the controller. At block 202, the position command PC is determined in the manner described above with reference to FIG. 2 and as described in the pending application Ser. No. 08/355,468.

Blocks 204–214 perform a series of checks to determine if the vehicle or the brake system is in an operating condition unsuitable for dynamic proportioning adjustment. At block 204, if the vehicle speed is determined to be less than a predetermined threshold speed, for example 12 MPH, the routine jumps to block 224, where the rear pedal command RRPC is set equal to the pedal command PC and the dynamic proportioning adjustment according to this invention is bypassed. The purpose of block 204 is to determine if the measured wheel speed signals have sufficient resolution. Depending on the wheel speed sensors used, the threshold speed will vary, but it is assumed that under the threshold speed, for example, 12 MPH, the wheel speed signal resolution is insufficient to perform dynamic proportioning adjustment according to this invention.

At block 206, the routine checks whether any ABS flags are set indicating that one or more wheels is in ABS mode. If any wheels are in ABS mode, then the wheel speed data is unacceptable for determining road speeds and, thus, for compensating for changes in rolling radius. If any wheels are in ABS mode, the routine jumps to block 224.

At block 208, the routine determines if the vehicle is in a turning maneuver. If so, the lateral weight shift induced by the turn will contaminate wheel speed information for purposes of compensating for forward weight shift. Thus, if the steering wheel angle is greater than a steering threshold indicating that the vehicle is in a turning maneuver, the routing jumps to block 224.

At block 210, the routine compares the previous measured wheel speed for each wheel with the present measured wheel speed for each wheel. If any wheel has a change in measured wheel speed greater than a jitter threshold, then it is assumed that the vehicle is on a rough, bumpy road, or snow, and the measured wheel speeds are not representative of vehicle road speed. If at block 210, any wheel has changed in measured wheel speed greater than the jitter threshold, then the routine jumps to block 224.

At block 212, the routine determines, from the measured wheel speeds, if any of the wheels is slipping. If at block 212, a wheel has slip, as detected by a wheel speed different from the other wheel speeds by more than a slip threshold, then the routine jumps to block 224.

At block 214, the routine checks to determine if any actuators have been commanded into the EMB hold mode. This check is used only on in systems with reciprocating piston type actuators that use an electromagnetic brake (EMB) to selectively hold the actuators in position. The EMB hold mode is an energy conserving feature that utilizes the EMB, instead of the actuator motor, to hold the brake actuator in a desired position. This saves energy because the EMB uses less power than the actuator motor. The EMB hold mode is typically activated when the brake command remains constant for a predetermined time period. If the system is in EMB hold mode, the routine jumps to block 224 and bypasses the dynamic proportioning adjustment steps.

If the routine passes all of the tests at blocks 204–214, then block 216 multiplies measured or computed vehicle deceleration (DECEL) by a predetermined front tire deformation constant Kfn and by a predetermined rear tire deformation constant Krn to determine front and rear tire deformation increments. Kfn and Krn are easily determined by one skilled in the art in a test vehicle as:

$$Kfn = -(LFraw(k) - LFraw(k-1))/DECEL \text{ and } Krn = -(LRraw(k) - LRraw(k-1))/DECEL$$

where, LFraw(k) is the measured front left wheel speed for the present loop of the control software, LFraw(k–1) is the measured front left wheel speed for the most recent previous loop of the control software, LRraw(k) is the measured left rear wheel speed for the present loop of the control software and LRraw(k–1) is the measured left rear wheel speed for the most recent previous loop of the control software. Because during braking the rear tire typically increases in rolling radius more than the front tire decreases in rolling radius, the rear tire deformation constant is typically greater than the front tire deformation constant.

Block 216 then determines the normalization factors for each wheel by subtracting from each previously determined normalization factor the product of the respective tire deformation constant and DECEL. Thus, block 216 determines:

$$LFn(k) = LFn(k-1) - (Kfn*DECEL),$$
$$RFn(k) = RFn(k-1) - (Kfn*DECEL),$$
$$LRn(k) = LRn(k-1) + (Krn*DECEL),$$
$$RRn(k) = RRn(k-1) + (Krn*DECEL),$$

where LFn, RFn, LRn and RRn are the left front, right front, left rear and right rear normalization factors, respectively.

Block 218 performs a filter function to determine the normalized wheel speeds according to:

$$LFfiltered = LFraw(k)*LFn(k)$$
$$RFfiltered = RFraw(k)*RFn(k)$$
$$LRfiltered = LRraw(k)*LRn(k)$$
$$RRfiltered = RRraw(k)*RRn(k),$$

where, LFfiltered, RFfiltered, LRfiltered and RRfiltered are the filtered normalized wheel speeds for the left front, right front, left rear and right rear vehicle wheels, respectively.

Block 220 uses the filtered normalized wheel speeds to determine a dynamic proportioning adjustment (DPA) according to:

$$DPA=[(LFfiltered+RFfiltered)-(LRfiltered+RRfiltered)]*Kdp,$$

where Kdp is a predetermined constant. In this example, a linear relationship between DPA and the difference in front and rear wheel speeds is used. Kdp will vary from vehicle to vehicle as a system designer desires based on the mount of adjustment to rear wheel brake gain desired responsive to tire deformation and based on field performance of a test vehicle.

Block 225 sets the rear pedal command, RRPC equal to the pedal command, PC, multiplied by DPA. Block 226 determines the motor current commands for the front two channels and the rear channel responsive to PC and RRPC according to FIG. 2 and block 228 outputs the motor current commands to the brake actuators.

An alternative implemetation of a rear brake control responsive to the normalized wheels speeds determined according to this invention is set forth in pending U.S. patent application, Ser. No. 08/513,191, filed concurrently with this invention and assigned to the assignee of this invention, the disclosure of which is incorporated herein by reference.

In the example set forth above, adjustment of the dynamic proportioning responsive to tire deformation is achieved by adjusting only the rear actuator command, reducing the commanded rear brake torque as the vehicle weight shifts from the rear wheels to the front wheels during a braking maneuver. In another example, the dynamic proportioning responsive to tire deformation may be achieved by adjusting the front actuator command to increase the commanded front brake torque as the vehicle weight shifts from the rear wheels to the front wheels during the braking maneuver. In yet another example, the dynamic proportioning responsive to tire deformation may be achieved by adjusting both the front and rear brake commands to increase the commanded from brake torque and decrease the commanded rear brake torque as the vehicle weight shifts from the rear wheels to the front wheels during a braking maneuver. In another example, the front and/or rear commanded brake torques are adjusted according to this invention and the sum of the front and rear commanded brake torques are held to a constant driver-commanded sum brake torque.

While the above example of this invention uses actuator position control, the actuators may alternatively be controlled according to this invention through closed loop pressure control.

While the example of this invention set forth above refers to reciprocating piston electrohydraulic brake actuators, this invention can be used with brake by wire systems that do not employ reciprocating piston actuators. Such other systems typically utilize a pump-fed pressurized hydraulic fluid source and solenoid valves to controllably apply hydraulic pressure from the fluid source and release pressure from the brakes. In utilizing this invention with pump-fed systems, the front and rear brake commands according to this invention serve as the control commands and are implemented together with a known manner of implementing the pump-fed brake control through closed-loop pressure control.

The embodiments of this invention in which an exclusive property or privilege is claimed are defined as follows:

1. A method of brake control, comprising the steps of:

determining vehicle deceleration;

multiplying the vehicle deceleration by a front tire deformation constant to determine a front tire deformation increment;

multiplying the vehicle deceleration by a rear tire deformation constant to determine a rear tire deformation increment;

determining an updated front tire normalization value by subtracting the front tire deformation increment from a previous front tire normalization value;

determining an updated rear tire normalization value by adding the rear tire deformation increment to a previous rear tire normalization value;

measuring at least one front wheel speed and at least one rear wheel speed;

determining an adjusted front wheel speed by multiplying the measured front wheel speed by the updated front tire normalization value;

determining an adjusted rear wheel speed by multiplying the measured rear wheel speed by the updated rear tire normalization value;

determining a dynamic proportioning adjustment responsive to the adjusted front and rear wheel speeds; and controlling brakes for the front and rear wheels responsive to the dynamic proportioning adjustment.

2. A method of brake control comprising:

receiving an operator-input brake command;

determining front and rear brake commands responsive to the operator-input brake command;

measuring wheel speed;

determining vehicle deceleration;

determining a dynamic proportioning adjustment responsive to the measured wheel speed, the vehicle deceleration and a tire deformation constant;

adjusting at least one of: (a) the from brake command and (b) the rear brake command in response to the dynamic proportioning adjustment; and controlling vehicle brakes according to the front and rear brake commands.

3. A method of brake control, comprising the steps of:

determining a deceleration of a vehicle;

measuring a first wheel rotational velocity of a front wheel of the vehicle;

measuring a second wheel rotational velocity of a rear wheel of the vehicle;

determining a front wheel normalization value responsive to the deceleration and a front tire deformation constant;

determining a rear wheel normalization value responsive to the deceleration and a rear tire deformation constant;

determining a front normalized wheel rotational velocity responsive to the front wheel normalization value and the first wheel rotational velocity, wherein the front normalized wheel rotational velocity is responsive to a front tire deformation that occurs during a braking maneuver of the vehicle;

determining a rear normalized wheel rotational velocity responsive to the rear wheel normalization value and the second wheel rotational velocity, wherein the rear normalized wheel rotational velocity is responsive to a rear tire deformation that occurs during a braking maneuver of the vehicle;

subtracting the front normalized wheel rotational velocity from the rear normalized wheel rotational velocity to determine a difference;

adjusting front to rear brake proportioning responsive to the difference, wherein front to rear brake proportioning is responsive to tire deformation that occurs during a braking maneuver.

4. A brake control method according to claim 3, wherein the step of adjusting front to rear brake proportioning comprises the step of:

multiplying the difference by a rear brake command to determine a modified rear brake command, wherein, commanded rear brake torque is reduced.

5. A brake control method according to claim 3, wherein the rear tire deformation constant has a first magnitude greater than a second magnitude of the front tire deformation constant, indicating a first rate of tire deformation of the rear wheel greater than a second rate of tire deformation of the front wheel.

* * * * *